(12) United States Patent
Ansari et al.

(10) Patent No.: US 11,049,101 B2
(45) Date of Patent: Jun. 29, 2021

(54) SECURE REMOTE TRANSACTION FRAMEWORK

(71) Applicant: Visa International Service Association, San Francisco, CA (US)

(72) Inventors: Ansar Ansari, San Ramon, CA (US); Marco Huerta, Emeryville, CA (US); Thomas Purves, San Francisco, CA (US); Kevin Carvalho, Sunnyvale, CA (US); Jalpesh Chitalia, Castro Valley, CA (US); Amit Gupta, Dublin, CA (US); Sang Wook Lee, San Ramon, CA (US); Barbara Patterson, South San Francisco, CA (US); Manoj Kannembath, Foster City, CA (US); Samuel Blake Shrauger, Lafayette, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 15/927,754

(22) Filed: Mar. 21, 2018

(65) Prior Publication Data

US 2018/0276660 A1    Sep. 27, 2018

Related U.S. Application Data

(60) Provisional application No. 62/474,546, filed on Mar. 21, 2017.

(51) Int. Cl.
*G06Q 20/38* (2012.01)
*G06Q 20/40* (2012.01)

(52) U.S. Cl.
CPC .......... *G06Q 20/385* (2013.01); *G06Q 20/40* (2013.01); *G06Q 20/401* (2013.01)

(58) Field of Classification Search
CPC .... G06Q 20/40; G06Q 20/4014; G06Q 20/12; G06Q 20/405; G06Q 20/425;
(Continued)

(56) References Cited

U.S. PATENT DOCUMENTS

2003/0208684 A1* 11/2003 Camacho ............. G06Q 20/401
 713/186
2004/0030659 A1*  2/2004 Gueh .................... G06Q 30/06
 705/67

(Continued)

FOREIGN PATENT DOCUMENTS

KR      1020160013221       2/2016
WO         2017165576       9/2017

OTHER PUBLICATIONS

"Managing Terrorism Financing Risk in Remittances and Money Transfers", Testimony by John Cassara on Jul. 18, 2017, 17 pages.*

(Continued)

*Primary Examiner* — Alexander G Kalinowski
*Assistant Examiner* — Sanjeev Malhotra
(74) *Attorney, Agent, or Firm* — Kilpatrick Townsend & Stockton LLP

(57) ABSTRACT

Embodiments of the invention are directed to systems and methods of providing secure remote transaction (SRT) transactions. In some embodiments, upon selection of a checkout element, a user may be identified with respect to a transaction to be completed. A number of accounts may then be identified in relation to that user. Upon selection of a particular account, the user may be authenticated using a facilitator application installed on a mobile computing device that supports authentication for the selected account. In some embodiments, the system may involve the use of a transaction-specific token generated upon receiving an authentication indicator from the facilitator application.

13 Claims, 9 Drawing Sheets

(58) Field of Classification Search
CPC ...... G06Q 20/385; G06Q 20/02; G06Q 20/10; G06Q 20/3224; G06Q 20/382; G06Q 20/4016; G06Q 40/02; G06Q 50/01; G06Q 20/32; G06Q 20/322; G06Q 20/3674; G06Q 20/40145; G06Q 30/0609; G06Q 40/12; G06Q 20/04; G06Q 20/0855; G06Q 20/20; G06Q 20/227; G06Q 20/38215; G06Q 20/401; G06Q 20/4012; G06Q 20/4037; G06Q 30/00; G06Q 30/06; G06Q 40/00; G06Q 40/025; H04L 63/08; H04L 63/083; H04L 63/0876; H04L 63/0861; H04L 63/102; H04L 9/3271; H04L 2463/082; H04L 2463/102; H04L 63/0807; H04L 63/0853; H04L 63/105; H04L 63/107; H04L 63/18; G06F 21/31; H04W 12/06; G07F 7/08
USPC ....... 705/14.55, 17, 26.8, 30, 42, 44, 50, 67, 705/71, 325; 726/3, 4, 5; 713/155, 186; 709/201; 463/29
See application file for complete search history.

(56) References Cited

U.S. PATENT DOCUMENTS

| | | | |
|---|---|---|---|
| 2006/0041507 A1* | 2/2006 | Novack | G06F 21/31 705/50 |
| 2008/0180212 A1 | 7/2008 | Aikawa et al. | |
| 2009/0192904 A1* | 7/2009 | Patterson | G06Q 20/20 705/17 |
| 2009/0240760 A1* | 9/2009 | McDougle | H04L 63/045 709/201 |
| 2009/0319425 A1* | 12/2009 | Tumminaro | G06Q 20/3223 705/42 |
| 2010/0063935 A1* | 3/2010 | Thomas | G06Q 20/4014 705/325 |
| 2011/0035319 A1* | 2/2011 | Brand | G06Q 20/10 705/44 |
| 2011/0093397 A1* | 4/2011 | Carlson | G06Q 10/10 705/67 |
| 2011/0106674 A1* | 5/2011 | Perlman | G06Q 20/40 705/30 |
| 2012/0011066 A1* | 1/2012 | Telle | G06Q 20/425 705/44 |
| 2012/0095852 A1 | 4/2012 | Bauer et al. | |
| 2012/0143752 A1 | 6/2012 | Wong et al. | |
| 2012/0246079 A1 | 9/2012 | Wilson et al. | |
| 2013/0013509 A1* | 1/2013 | Perlman | G06Q 20/4037 705/44 |
| 2013/0055362 A1* | 2/2013 | Rathbun | H04L 63/0853 726/5 |
| 2013/0226792 A1 | 8/2013 | Kushevsky et al. | |
| 2013/0254115 A1 | 9/2013 | Pasa et al. | |
| 2013/0268437 A1 | 10/2013 | Desai et al. | |
| 2013/0346313 A1* | 12/2013 | Wankmueller | H04L 63/12 705/44 |
| 2014/0012758 A1* | 1/2014 | Keresman, III | G06Q 20/409 705/44 |
| 2014/0164254 A1 | 6/2014 | Dimmick | |
| 2014/0222616 A1* | 8/2014 | Siemiatkowski | G06Q 20/40 705/26.8 |
| 2014/0258125 A1* | 9/2014 | Gerber | G06Q 20/40 705/44 |
| 2014/0304162 A1* | 10/2014 | Pereira | G06Q 20/40 705/44 |
| 2015/0058931 A1* | 2/2015 | Miu | G06Q 20/4016 726/3 |
| 2015/0088754 A1* | 3/2015 | Kirsch | G06Q 20/12 705/71 |
| 2015/0120559 A1* | 4/2015 | Fisher | G06Q 20/4016 705/44 |
| 2015/0143106 A1* | 5/2015 | Wentker | G06Q 20/40 713/155 |
| 2015/0186890 A1* | 7/2015 | Li | G06Q 20/02 705/44 |
| 2015/0213542 A1* | 7/2015 | Wallaja | G06Q 20/3226 705/14.55 |
| 2016/0004857 A1* | 1/2016 | Chen | H04W 12/06 726/3 |
| 2016/0005038 A1 | 1/2016 | Kamal et al. | |
| 2016/0086453 A1* | 3/2016 | Cage | G07F 17/3223 463/29 |
| 2016/0148201 A1 | 5/2016 | Kadaster et al. | |
| 2016/0182523 A1* | 6/2016 | Pelegero | H04L 63/083 726/4 |
| 2016/0358178 A1* | 12/2016 | Ghosh | G06F 21/316 |
| 2016/0359850 A1* | 12/2016 | Weiss | G06Q 20/40145 |
| 2017/0004136 A1* | 1/2017 | Cassel | G06F 16/9535 |
| 2017/0193504 A1 | 7/2017 | Godsey et al. | |
| 2017/0278096 A1 | 9/2017 | Chitalia et al. | |
| 2017/0344729 A1* | 11/2017 | Kohli | G06F 21/105 |
| 2017/0366530 A1* | 12/2017 | Dominguez | G06Q 20/3674 |
| 2018/0041518 A1* | 2/2018 | Jacobs | H04W 4/21 |
| 2018/0225671 A1* | 8/2018 | Brown | H04L 63/0869 |
| 2018/0234418 A1* | 8/2018 | Brown | H04L 63/0861 |

OTHER PUBLICATIONS

"The Hawala Alternative Remittance System and Its Role in Money Laundering", by Jost and Sandhu, published in Jan. 2000, 27 pages.*
"Misplaced Blame: Islam, Terrorism and the Origins of Hawala", by Thomoson, published in 2007, Max Planck UN Year Book vol. 11, 28 pages.*
Report of the US Secretary of Tresury to US Congress, Nov. 2002, 47 pages.*
Report to US Congess submitted by US Tresury Secretray, Board of Governors of the Federal Reserve System, and the Securities and Exchange Commission, on Dec. 31, 2002, 40 pages.*
PCT/US2017/023686 , "International Search Report and Written Opinion", dated Jun. 30, 2017, 13 pages.
EP17771105.8 , "Extended European Search Report", dated Mar. 19, 2019, 8 pages.
U.S. Appl. No. 15/466,815 , "Final Office Action", dated Nov. 26, 2019, 17 pages.
Non-Final Office Action mailed for U.S. Appl. No. 15/466,815 dated Sep. 1, 2020, 13 pages.
Final Office Action dated Dec. 21, 2020 for U.S. Appl. No. 15/466,815, 21 pages.
European Office Action dated Feb. 1, 2021 for EP Application No. 17771105.8, 7 pages.

* cited by examiner

SECURE REMOTE TRANSACTION FRAMEWORK

CROSS-REFERENCES TO RELATED APPLICATIONS

This international application claims priority to U.S. Patent Application No. 62/474,546, filed on Mar. 21, 2017, the disclosure of which is herein incorporated by reference in its entirety for all purposes.

BACKGROUND

Because conducting transactions over electronic networks such as the Internet has a number of advantages that include convenience and lower costs, electronic commerce has recently experienced a large amount of growth. However, the anonymity of the Internet increases the issues of fraud and misuse to an electronic retailer. An electronic resource provider has a desire to authenticate a transaction in order to reduce the risk of loss stemming from fraud. Similarly, a consumer has a desire to increase convenience by enabling the use of more channels. Additionally, a consumer often has a desire to remain anonymous, as exposure of personal information may often put the consumer at increased risk.

Conventional remote transaction systems can authenticate a user prior to allowing the user to conduct a remote transaction. However, such conventional remote systems are typically implemented such that there is only one authenticting entity (e.g., a bank) that uses a specified authentication protocol. Such systems and protocols are effectively "hard-wired" and any changes to improve such systems need to be specifically initiated by the authenticating entity. This can be difficult for the authenticating entity, since there may be many parties to a typical transaction system (e.g., a merchant, a payment network, a user), and any changes would require the cooperation of each of such entities. Further, as user's devices in today's world can communicate with many different types of entities so a conventional authentication system used with one specific authenticating entity may not be the most effective and secure solution avaliable.

As authentication technologies improve, it is better to leverage the authentication capabilities that may be provided by different entities such as different application providers (e.g., different wallet providers, different data access providers, etc.). Further, as new authentication capabilities are developed, it would be desirable to easily integrate those new capabilties with existing systems and methods. However, there are currently no readily available and adaptable ways of accomplishing this.

Embodiments of the present invention address these problems and other problems, individually and collectively.

SUMMARY

Described herein are a system and techniques for providing secure remote transaction (SRT) transactions. In some embodiments, users are able to access resources provided by resource providers over an unsecured network. Upon selection of a checkout element associated with the resource provider via a user device, a user may be identified with respect to a transaction to be completed. A number of accounts may then be identified in relation to that user. Upon selection of a particular account of the number of accounts, the user may be authenticated using a facilitator application installed on the user device that supports authentication for the selected account. In some embodiments, the system may involve the use of a transaction-specific token generated upon receiving an authentication indicator from the facilitator application.

One embodiment of the invention is directed to a method comprising receiving a request to complete a transaction, determining an identity of a user associated with the request to complete the transaction, determining a number of accounts associated with the user, receiving a selection of an account from the number of accounts, identifying one or more facilitators capable of supporting the selected account, selecting a facilitator from the list of the one or more facilitators to authenticate the user, and causing the selected facilitator to be initiated to perform an authentication process with respect to the user.

Another embodiment of the invention is directed to a computing system comprising a processor, and a memory including instructions that, when executed with the processor, cause the computing system to, at least: receive, from an initiator, a request to complete a transaction, determine an identity of a user associated with the request to complete the transaction, determine a number of accounts associated with the user, receive a selection of an account from the number of accounts, identify one or more facilitators capable of supporting the selected account, select a facilitator from the list of the one or more facilitators to authenticate the user, and cause the selected facilitator to be initiated to perform an authentication process with respect to the user.

Further details regarding embodiments of the disclosure can be found in the Detailed Description and the Figures.

DETAILED DESCRIPTION

Figure 1:
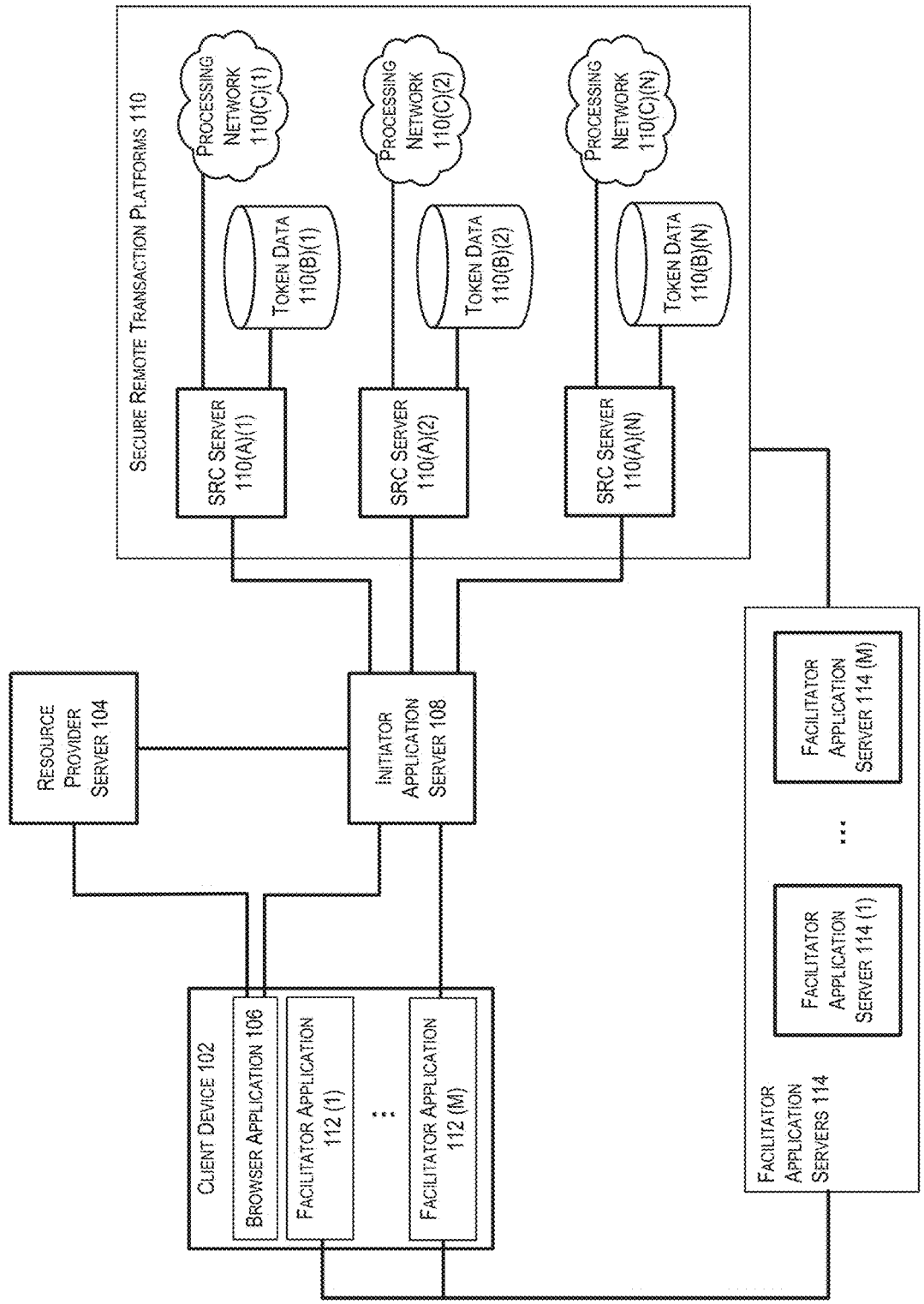
FIG. 1 depicts a number of components that may be involved in a system used to implement at least some embodiments of the disclosure.

Embodiments of the disclosure are directed to simplifying electronic resource provider acceptance by providing a standardized payload, integrating local security applications, and increasing resource provider trust for transactions conducted. In embodiments of the disclosure, users are provided the capability to select from a number of their accounts, each of which may be associated with a different secure remote transaction platform, to complete a transaction. The transaction may then be made more secure through the use of a local facilitator application that supports the selected account.

In embodiments of the disclosure, a user may be provided with the ability to select a checkout element embedded in a resource provider checkout page accessed via a client computing device. Upon selection of the checkout element, the client computing device may be caused to initiate communication with a remote initiator server. The initiator server may receive a number of transaction details from the client computing device, as well as user-identifying information. In some embodiments, the initiator server may derive various information from cookies placed upon the client computing device.

In some embodiments, the initiator server, upon receiving this information, may identify a user identity associated with the transaction. Once the user identity has been identified, the initiator server may determine a number of accounts associated with that user identity. A list of these accounts may be provided to the client computing device to be presented to the user. Upon selection of one of the accounts, the initiator server may communicate the selection to a secure remote transaction (SRT) platform associated with that account.

The SRT platform may then identify a number of facilitator applications that support authentication of the selected account and are installed on the client computing device (or a different device operated by the user). In some embodiments, the list may also be provided to the client computing device for selection by the user. In some embodiments, a particular facilitator application may be selected automatically (e.g., without user interaction) by the SRT platform. The SRT platform may provide instructions to the client computing device to cause the selected facilitator application to execute. The facilitator application may subsequently perform an authentication process to verify the identity of the user of the client computing device. Once authenticated, the facilitator application may provide an authentication indicator back to the SRT platform. Upon receiving this authentication indicator, the SRT platform may generate a token specific to the transaction, which may then be provided to the initiator application and subsequently to the resource provider in order to complete the transaction.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

"Account credentials" may include any suitable information associated with an account (e.g. a account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

An "acquirer" may typically be a business entity (e.g., a commercial bank) that has a business relationship with a particular resource provider or other entity. Some entities can perform both issuer and acquirer functions. Some embodiments may encompass such single entity issuer-acquirers. An acquirer may operate an acquirer computer, which can also be generically referred to as a "transport computer."

An "authentication indicator" may be any suitable piece of data that provides additional proof that a particular circumstance is authentic. Exemplary authentication indictors may include cryptograms, flags, or other data which can indicate that a user was authenticated by a computing device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction.

An "authorization entity" may be an entity that authorizes a request.

Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user.

A "computing device" may include any suitable device that can electronically process data. Examples of computing devices include desktop computers, mobile devices or mobile computing devices, television sets, etc.

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver, A "facilitator" may be any entity capable of authenticating a user of a client device. A facilitator may include a client-side application (e.g., a facilitator application) as well as a backend server (e.g., a facilitator server) capable of supporting the client-side application. In some cases, a facilitator application may be executed upon receiving instructions from a facilitator server to authenticate a user of the client device. The facilitator application may cause the client device upon which it is installed to obtain user-specific data. This user-specific data may then be compared to expected user-specific data, either by the facilitator application on the client device or by the facilitator server, to determine whether the obtained user-specific data matches the expected user-specific data. In some embodiments, a facilitator may be an electronic wallet provider (e.g., Apple Pay). It should be noted that the facilitator may be unaffiliated with the SRT Platform and/or the initiator.

An "initiator" may be any entity capable of facilitating communication between a resource provider and one or more SRT platforms. An initiator may operate a number of servers which provide at least a portion of the functionality described herein. In some cases, an initiator may obtain approval and/or accreditation from one or more SRT platforms in order to operate in conjunction with those SRT platforms. A resource provider may enroll with the initiator in order to obtain access to at least a portion of the processes described herein. An initiator may provide each resource provider that enrolls with it a link to embed within a checkout element. The link, when activated by a user wishing to transact with the resource provider, may initiate the processes described herein in order to facilitate a transaction between the user and the resource provider. It should be noted that the initiator may be unaffiliated with the SRT Platform and/or the facilitator.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction) .Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services, A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "secure remote transaction (SRT) platform" may be any entity capable of facilitating a transaction in the manners described. A SRT platform may be capable of communicating with an initiator, a facilitator, and a transaction processing network. In some embodiments, a SRT platform may include a SRT server, a token provider, and a transaction processing network. An SRT platform may be configured to perform one or more processes that include: receive a request for a transaction from an initiator, identify an account associated with the transaction, determine an appropriate facilitator for the account, cause the determined facilitator to authenticate a user associated with the account, generate a token to be used in the transaction, and provide the token to the initiator to complete the transaction.

A "token" may be a substitute value for a credential. A token may be a string of numbers, letters, or any other suitable characters. Examples of tokens include tokens, access tokens, personal identification tokens, etc. A token may include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, an account identifier (e.g., a primary account number (PAN)) may be tokenized by replacing the primary account identifier with a substitute number (e.g. a token) that may be associated with the account identifier. Further, tokenization may be applied to any other information that may be replaced with a substitute value. Tokenization may be used to enhance transaction efficiency, improve transaction security, increase service transparency, or to provide a method for third-party enablement.

A "token provider" or "token service system" can include one or more computers that service tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN and conducting a transaction using that PAN. In some embodiments, a token service system may include a tokenization computer alone, or in combination with other computers such as a transaction processing network computer. Various entities of a tokenization ecosystem may assume the roles of the token provider. For example, processing networks and issuers or their agents may become the token provider by implementing the token services according to embodiments of the present invention.

A "token vault" may refer to a repository that maintains established token-to-PAN mappings. According to various embodiments, the token vault may also maintain other attributes of the token requester that may be determined at the time of registration and that may be used by the token SRT server to apply domain restrictions or other controls during transaction processing. The token vault may be a part of the token service system. In some embodiments, the token vault may be provided as a part of the token SRT server. Alternatively, the token vault may be a remote repository accessible by the token SRT server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entitites (e.g., issuers), acquirers, merchants, and payment device users.

A "user" may include an individual. In some embodiments, a user may be associated with one or more personal accounts and/or mobile devices. The user may also be referred to as a cardholder, account holder, or consumer.

FIG. 1 depicts a number of components that may be involved in a system used to implement at least some embodiments of the disclosure. In FIG. 1, a client device 102 may be in communication with a number of remote entities via a network connection (either wireless or physical). For example, the client device 102 may be used to access a website maintained by a resource provider server 104 via a browser application 106. In this example, the website may have embedded a checkout element configured to cause the client device 102 to initiate communication with a initiator server 108. The initiator server 108 may, in turn, be in communication with a number of secure remote transaction (SRT) platforms 110.

In some embodiments, the client device 102 may have installed on it a number of facilitator applications 112 (1-M). The facilitator applications may be configured to cause the client device 102 to communicate with a number of facilitator application servers 114 (1-M). In some embodiments, the client device 102 may store, in its memory, a number of cookies.

In some embodiments of the invention, the client device 102 may be a mobile device (e.g. a mobile phone). The mobile device may be capable of communicating with cell towers (e.g., via cellular communications such as GSM, LTE, 4G) and wireless routers (e.g., via WiFi). The mobile device may store the user's account credentials, such as a PAN (primary account number), a token, a name, an address, a CVV, an expiration date, and any other suitable information. Such data may be securely stored via hardware (e.g., a secure element) or software.

In some embodiments, the resource provider server 104 may be affiliated with an online retailer or another suitable resource provider having an electronic catalog. The resource provider server 104 may serve one or more pages of a resource provider website to a browser 106 installed on the client device 102. In some embodiments, the website served to the browser application may contain a portal or link that, when accessed using the browser application, initiates communication with the initiator server 108.

The initiator server 108 may be any suitable computing device configured to identify a user, identify accounts for that user, receive a selection of one of those accounts, communicate the selected account to an SRT platform 110 associated with that account, and complete a transaction using the selected account.

In some embodiments, there may be a number of SRT platforms 110 (1-N) and the SRT platforms may each be associated with a transaction processing network. Each SRT platform may include some combination of an SRT server (or servers) 110(A), token data 110(B), and a processing network 110(C). Multiple accounts may be associated with a single SRT platform. For example, a user may be associated with two different accounts which are each associated with different authentication entities, while both accounts are able to be processed using a single SRT platform. The SRT server 110(A), may be configured to identify one or more facilitator applications 112 associated with an account and cause the user to be authenticated using one of those facilitator applications 112. This may involve communicating a request for authentication to a facilitator application server 114 associated with a particular facilitator application 112.

Additionally, once the user has been authenticated, the SRT server 110(A) may be configured to generate a token to be associated with a transaction which is stored in the respective token data 110(B). The SRT server 110(A) may pass the token to the initiator server 208, which may generate transaction information that includes the token to be used for a transaction. A mapping between the token and the transaction may be maintained by the SRT server 110(A) in its respective token data. In some embodiments, the SRT server 110(A) may receive a number of files from various authorization entities, each of which may include mappings between email addresses and various PANs. In this way, the SRT server 110(A) may maintain a mapping between user identifier information and accounts.

The facilitator applications 112 may be any suitable set of computer-executable instructions installed on the client device 102 that, when executed, causes the client device 102 to perform an authentication process. In some embodiments, the authentication process may involve the collection of biometric information associated with a user of the client device 102. For example, the facilitator application 112 may obtain voiceprint or fingerprint data to be used to authenticate the user. The facilitator application may be tied to hardware installed on the client device 102. Examples of facilitator applications 112 may include fingerprint, retinal, or voice scanning applications. The hardware associated with those applications may include fingerprint, retinal, or voice scanning hardware such as fingerprint, retinal, or voice sensors. Other types of facilitator applications 112 may also include PIN and password facilitator applications. In some embodiments, a facilitator application 112 may be a wallet SRT server.

The facilitator application servers 114 may be any suitable computing device that provides support for the facilitator applications 112. In some embodiments, the facilitator application server 114 may perform authentication processing on behalf of the facilitator application 112. For example, the facilitator application 112 may cause the client device 102 to obtain authentication data from a user of the client device 102.. Once obtained, the authentication data may be transmitted to the facilitator application server 114 that corresponds to the facilitator application used to collect the authentication data. The authentication data may then be compared to authentication data on record for that user by the facilitator application server 114.

For an illustrative example of at least some embodiments of the disclosure, consider a scenario in which a user accesses a merchant (resource provider 104) website to complete a transaction (e.g., make a purchase). In this scenario, the user may, upon selecting a number of items for the transaction, be served a checkout page for the merchant website. The checkout page may include a list of the items, prices, quantities, or any other suitable transaction-related information. In addition, the checkout page may include a checkout element that may be selected to initiate a transaction. Once the checkout element has been selected, the user may be given the ability to select an account in order to complete the transaction.

In the scenario above, upon selection of the checkout element by the user of the client device 102, the client device 102 may be caused to initiate communication with the initiator server 208. This may involve the transmission of a number of transaction-related details from the client device 102 to the initiator server 106. In some embodiments, the client device 102 may also transmit user-identifying information to the initiator server 108. For example, a helper feature in the browser application may provide user identifier information (e.g., via cookies). The initiator server 108 may then identify the user associated with the transaction. If the initiator server 108 is not able to identify the user based on the user-identifying information, then the user may be asked to self-identify (e.g., login).

Once a user has been identified by the initiator server 106, the initiator server 108 may send requests to a number of different SRT platforms 110 to identify accounts associated with the identified user. In some embodiments, a user may have several accounts with a SRT platforms 110 (e.g., across multiple issuers within the same transaction processing network). The initiator server 108 may receive responses from each of the number of different SRT platforms 110 with a list of accounts associated with the user. Once received, the lists may be aggregated into a single list including each of the identified accounts.

Once an aggregated list of accounts has been created, it may be presented to the user via the client device 102. In this scenario, the user may be presented with a number of different accounts belonging to him or her, with which the transaction should be completed. The user may then select one of the accounts from the list. Once this selection has been made, it is transmitted to the initiator server 108 and onto the SRT platform 110 associated with the selected account, Upon receiving a selection of an account to be used, the SRT platform 110 may identify a facilitator application capable of supporting the selected account. In some embodiments, the initiator application may identify a number of available facilitator applications 112 (1-M) installed on the client device 102 based on cookies stored on the client device 102. For example, each facilitator application 112 installed on the client device 102 may maintain a cookie in the memory of the client device 102. These cookies may include identifiers for the facilitator application 112 as well as graphics and/or icon images (e.g., card art). The initiator server 108 may receive a list of these cookies from the client device 102 and may determine which, if any, of the facilitator applications on the list are capable of supporting the selected account. In some embodiments, this may be determined based on a level of trust associated with each of the facilitator applications. In some embodiments, this may also be determined based on the authentication processes utilized by the facilitator applications.

In some embodiments, once a list of supporting facilitator applications 112 has been generated, it may be presented to the user for selection. Upon receiving a selection of a particular facilitator application 112 from the list, the initiator application 108 may provide that selection to the SRT platform 110 (e.g., the SRT platform that includes SRT server 110(A)(1), token data 110(B)(1) and processing network 110(C)(1). In some embodiments, a particular facilitator application 112 may be selected automatically. The SRT platform 110 may cause the selected facilitator application 112 to be executed in order to authenticate the user. The facilitator application 112 may then execute an authentication process and, upon completion of the authentication process, may return an authentication indicator that indicates whether or not the user is authenticated to the SRT platform 110.

Upon receiving an authentication indicator indicating that the user is authenticated, the SRT platform 110 may generate a token to be associated with the requested transaction. The token may be mapped to the selected account via the token data 110(B). Once a token has been assigned to the transaction, the SRT platform 110 may provide the token to the initiator server 108. The initiator server 108 may generate transaction information to be provided to the resource provider that includes the token. The initiator server 108 may subsequently use the received token to complete the requested transaction.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communication protocol.

Figure 2:
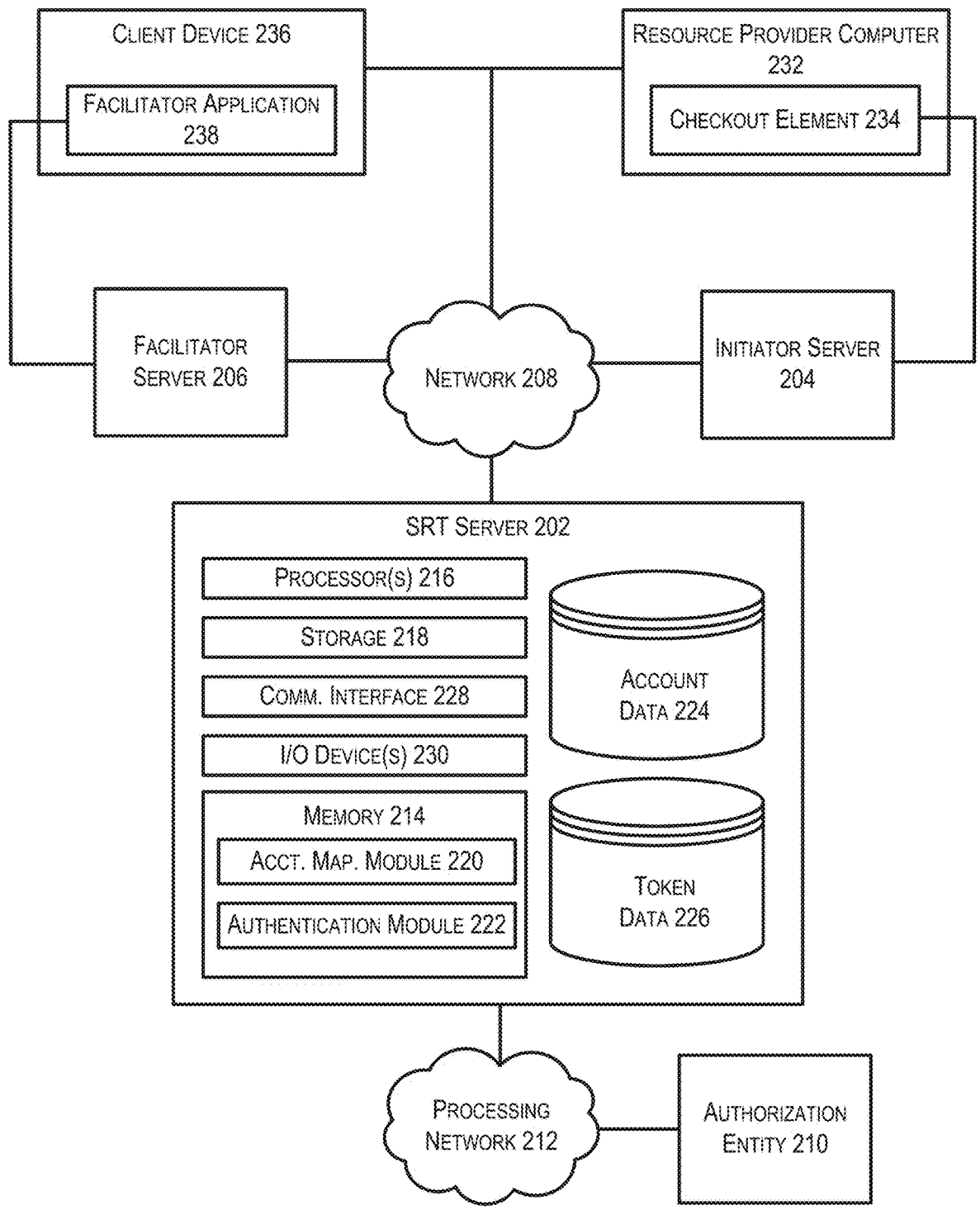
FIG. 2 depicts an example system architecture that may be implemented to provide secure remote transaction in accordance with embodiments of the disclosure.

FIG. 2 depicts an example system architecture that may be implemented to provide secure remote transaction in accordance with embodiments of the disclosure. In FIG. 2, a SRT server 202 may be in communication with a number of initiator servers 204 and facilitator servers 206 via a network connection 208. The SRT server 202 may also be in communication with a number of authorization entities 210 via a transaction processing network 212. In some embodiments, the SRT server 202 may be an example SRT server 110 of FIG. 1.

In at least some embodiments, the SRT server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described.

The memory 214 may store program instructions that are loadable and executable on the processor(s) 216, as well as data generated during the execution of these programs. Depending on the configuration and type of SRT server 202, the memory 214 may be volatile (such as random access memory (RAM)) and/or non-volatile (such as read-only memory (ROM), flash memory, etc.). The SRT server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the SRT server 202. In some embodiments, the memory 214 may include multiple different types of memory, such as static random access memory (SRAM), dynamic random access memory (DRAM) or ROM.

Turning to the contents of the memory 214 in more detail, the memory 214 may include an operating system and one or more application programs or services for implementing the features disclosed herein including at least a module for identifying accounts and generating tokens for a user (account mapping module 220) and a module for initiating authentication of a user via a facilitator application (authentication module 222). The memory 214 may also include account data 224, which provides data stored in association with a user account and/or token data 220, which provides a mapping between a generated token and a transaction or account.

In some embodiments, the account mapping module 220 may, in conjunction with the processor 216, be configured to receive an identifier from an initiator application and identify one or more accounts based on that identifier. In some embodiments, the account mapping module 220 may be provided with an identifier for a user, such as an email address or alias. In some embodiments, the account mapping module 220 may be provided with a device identifier. In at least some of these embodiments, the account mapping module 220 may communicate with the device associated with the device identifier to determine whether it has cookies stored in its memory which are associated with the SRT server 202. For example, the SRT server 202 may support a separate mobile application installed upon a user's client device 236 and that separate mobile application may generate a cookie to be stored upon the client device 236 to assist with login. In this example, the SRT Server, or the initiator server acting on the SRT server's behalf, may identify the cookies stored in memory of the client device and identify one or more accounts based on those cookies. In some embodiments, the cookies may include account identifiers which may be used to identify particular accounts.

In some embodiments, the authentication module 222 may, in conjunction with the processor 216, be configured to receive an indication that a transaction is to be conducted with respect to a particular account and may cause a user associated with the transaction to be authenticated. To do this, the authentication module 222 may identify one or more facilitator applications 238 and/or authentication techniques associated with the identified account. In some cases, this may involve determining what facilitator applications 238 have been used with the account in the past. In some cases, this may involve receiving account authentication requirements from an authorization entity 210 associated with the account (e.g., an issuer) that indicate which facilitator applications 238 and/or authentication techniques are suitable for use with the account. In some embodiments, the authentication module 222 may compile a list of suitable facilitator applications, which it may provide to the client device 236 via the initiator server. In these embodiments, the user may be given the ability to select an appropriate facilitator application 238 from the list of facilitator applications. In some embodiments, the authentication module 222 may select a most-appropriate facilitator application 238 from the available facilitator applications. For example, in some embodiments, each facilitator application may be associated with a level of trust. The authentication module 222 may select the facilitator application associated with the highest level of trust. In some embodiments, the authentication module 222 may select a default facilitator application 238 if it is available. Once the facilitator application 238 has been selected, the SRT server 202 may communicate with a facilitator server 206 associated with that facilitator application 238. The facilitator server 206 may then cause the facilitator application 238 installed on the client device 236 to be executed in order to authenticate the user of the client device 236. Upon receiving an indication that the user has been authenticated, the facilitator server 206 may provide that indication to the authentication module 222. In some embodiments, the authentication module 222 may also receive an indication of additional information to be associated with the transaction. For example, the authentication module 222 may receive shipping information for the transaction from the facilitator server 206.

In some embodiments, the account mapping module 220 may, in conjunction with the processor 216, be further configured to generate a token to be used in the transaction. Once the account mapping module 220 has received an indication from the authentication module 222 that a user has been authenticated, the account mapping module 220 may generate a token to be used by the initiator server 204 to complete the transaction. In some embodiments, the token may be a one-time use token which is only authorized for use with the specific transaction at issue. In some embodiments, the token may be specific to both the client device 236 and the initiator server 204, in that the token may be used multiple times by the initiator server 204 for that client device 236. For example, upon conducting with a particular client device 236 for the first time, the initiator server 204 may receive a token generated in the manner described herein. The initiator server 204 may then store the token in memory for use with the client device 236 until an expiration date (or some other suitable expiration condition) associated with that token. The account mapping module 220 may store the generated token in a token vault (e.g., token data 226) with a mapping to the account for which the token was generated. Upon receiving an authorization request message that includes the token, the SRT server 202 may query the token vault to identify the account associated with the token. The SRT server 202 may then proceed with the transaction of the authorization request message using the identified account information.

The SRT server 202 may also contain communications interface(s) 228 that enable the SRT server 202 to communicate with a stored database, another computing device or server, one or more remote devices, other application servers, and/or any other suitable electronic devices. In some embodiments, the communication interface 228 may enable the SRT server 202 to communicate with other electronic devices on a network (e.g., on a private network). The SRT server 202 may also include input/output (I/O) device(s) and/or ports 230, such as for enabling connection with a keyboard, a mouse, a pen, a voice input device, a touch input device, a display, speakers, a printer, etc.

In some embodiments, the initiator server 204 may include a server device configured to conduct transactions between one or more resource provider computers 232 and one or more SRT servers 202. In some embodiments, the initiator server 204 may be configured to provide functionality for a checkout element 234 implemented via a checkout page. In some embodiments, resource provider computer 232 may host or otherwise maintain an online webpage in order to provide access to various resources. In these embodiments, a checkout element embedded into the online webpage may direct a user that selects the checkout element to a separate application (i.e., an initiator application) executed by the initiator server 204. Upon execution of the initiator application, the initiator server may perform at least a portion of the functionality described herein.

In some embodiments, the facilitator server 206 may include a server device in communication with a client device 236. The facilitator server 206 may be configured to provide back end support for a facilitator application 238 installed upon the client device 236. The client device 236 may be any electronic device capable of communicating with the resource provider 232 and another entity. For example, the client device 236 may be a mobile phone capable of wirelessly communicating with other electronic devices. In some embodiments, the facilitator application 238 may be a mobile application installed upon, and executed from, the client device 236.

Figure 3:
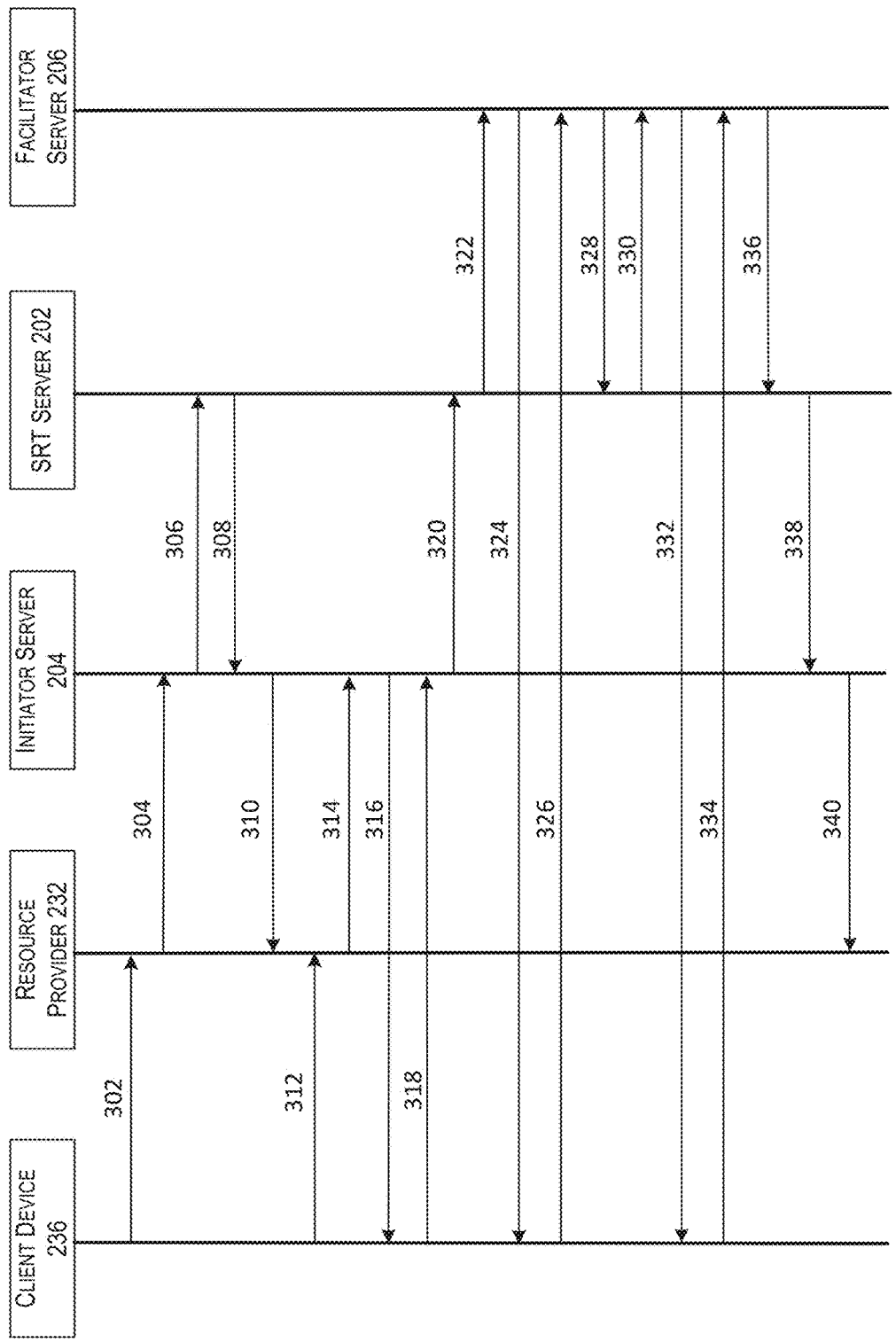
FIG. 3 depicts a swim lane diagram which illustrates an example process for conducting a transaction using a SRT platform in accordance with at least some embodiments.

FIG. 3 depicts a swim lane diagram which illustrates an example process for conducting a transaction using a SRT platform in accordance with at least some embodiments. Depicted in FIG. 3 are interactions between various components as described herein. In particular, the process 300 depicts interactions between a client device 236, a resource provider 232, an initiator server 204, a SRT server 202, and a facilitator server 206.

Process 300 may begin at 302, when a user visits a checkout page (e.g., an electronic shopping cart) associated with a resource provider. In some embodiments, the user may select a number of resources (e.g., goods and/or services) provided by an electronic retailer. Once the user has selected a number of resources, the user may select an option to complete a transaction for the resources and may be provided with a checkout page.

On the checkout page, the resource provider may display an embedded checkout element at 304. In some embodiments, when a user visits a checkout page with an embedded checkout element, the initiator may determine whether or not the user is a recognized user. To do this, the initiator may receive identifier information from the resource provider or from an application (e.g., the checkout element) embedded within the checkout page. In some embodiments, when the user visits a checkout page or selects the checkout element on a resource provider checkout page, that user's email address may be transmitted by the browser (e.g., via a helper feature) to the initiator server. In the scenario in which the initiator server 204 is able to obtain an identifier (e.g., an email address) for the user, the initiator server 204 may transmit that identifier to a number of different SRT servers 202 which support the initiator server 204 at 306. The SRT servers 202, upon receiving the identifier information, may each determine whether or not an authorization entity associated with the SRT server maintains at least one account associated with that user. In some embodiments, this may involve the SRT server querying a number of authorization servers. In some embodiments, each of the SRT servers 202 may maintain mappings between various accounts and identifiers. In these embodiments, the SRT servers 202 may each query a database that it maintains in order to identify a list of accounts based on the identifier. Upon identifying a number of accounts, the SRT server may return a list of those accounts to the initiator server 204 at 308. If the SRT server has not been able to identify any accounts associated with the identifier, then the SRT server may return an indication that the user is not recognized. In some embodiments, the initiator server 204 may cause the checkout element to display a checkout button once the initiator server 204 has received responses from the SRT servers to which the requests were sent (whether or not the user is recognized) at 310.

At 312, the user may initiate a transaction with the resource provider via the checkout page by selecting the checkout button. Upon detecting that the checkout button has been selected, the resource provider 232 may send information to the initiator server 204 to initiate a transaction at 314. For example, the resource provider 232 may send information related to one or more resources to be obtained by the user as well as a total cost or any other suitable information. It should be noted that these steps may be performed before, after, or concurrently with steps 306 and 308.

In the scenario in which the user's email address is unable to be obtained from the browser, the user may be asked to enter his or her email address. The initiator server may then identify that user's accounts from the file including the mapping of the accounts to the user's email address. In some embodiments, if the initiator server is unable to identify an account from the mapping file, then the user may be asked to provide an account identifier. The initiator may perform more or more authentication techniques in order to confirm that the user is actually in possession of a provided email address. For example, in some embodiments, the initiator server may send a one-time password (e.g., a code or pin) to the email address, which the initiator may require that the user provide back. The SRT server may then query the SRT servers in the manner described above to identify a number of accounts available for a user.

Once the initiator server 204 has identified a user and a list of accounts associated with that user, the initiator server 204 may provide the list of accounts to the user at 316. The initiator server 204 may enable the user to select a specific account from the list of accounts to be used to complete the transaction. The user's selection of a specific account is then provided to the initiator server 204 at 318. Upon receiving this selection, the initiator server 204 may identify the SRT server associated with the selected account. The initiator server 204 may generate and transmit a request to the appropriate SRT server 202 at 320. In some embodiments, the request may include details of the transaction to be conducted. It should be noted that each account is associated with only one SRT server 202 whereas a single SRT server 202 may be associated with multiple accounts.

Once the request has been received by the SRT server and the user for the transaction has been identified, account information stored by the SRT server 202 may be identified with respect to that user. For example, the user may be associated with one or more client devices, a shipping address, a billing address, or any other suitable user-related information. In some embodiments, the user may be associated with a default client device that may be selected automatically. Once the account information has been identified, the user may be asked to authenticate himself or herself using a separate authentication process 206. It should be noted that the authentication process 206 may be separate from any login required in user identification process 204. In some embodiments, if this is the first time that the user has utilized a particular account with a particular browser application, the user may be required to perform one or more extra steps to confirm his or her identity (e.g., a IDD process). Once this is done, the user's identity may be securely bound to the user's identity within the browser.

The SRT server, upon identifying the account selected by the user, may determine one or more facilitator applications available to provide authentication for the account. In some embodiments, a list of facilitator applications appropriate for authenticating a user with respect to a particular account may be provided to the SRT server by an authorization entity that maintains the account. In some embodiments, one or more capabilities of the facilitator application may be identified based at least in part on a level of trust associated with the facilitator applications. In some embodiments, one or more facilitator applications may be selected based on authentication capabilities available via the facilitator applications. For example, a list of facilitator applications may be selected that provide fingerprint authentication. In some embodiments, the SRT server 202 may provide the list of facilitator applications to the user for the user to elect a preferred facilitator application. In some embodiments, the SRT server 202 may select an appropriate facilitator application from the list of available facilitator applications. In some embodiments, the appropriate facilitator application may be selected based on one or more attributes of the facilitator application.

Once the SRT server 202 has received an indication of an appropriate facilitator application to be used in the transaction, the SRT server 202 may transmit a request to the facilitator server 206 associated with that facilitator application at 322. In some embodiments, the SRT server 202 may transmit at least a portion of the transaction information to the facilitator server 206.

Upon receiving the request to authenticate the user for the transaction, the facilitator server 206 may provide instructions to a facilitator application installed on the client device 236 at 324. In some embodiments, the instructions may be provided to the facilitator application via a push notification. The instructions may cause the facilitator application to be executed upon the client device in order to authenticate the user. Upon execution, the facilitator application may perform the requested authentication process. In some embodiments, this may involve causing the client device 236 to obtain biometric or other user-specific information from the user. The obtained user-specific data may then be compared to user-specific data stored by the facilitator application. The user may be authenticated if the obtained user-specific information matches the stored user-specific information to some predetermined extent.

Once the user has been authenticated by the facilitator application using the authentication process, the facilitator application may transmit an indication that the user has been authenticated to the facilitator server 206 at 326. In some embodiments, the authentication process may be performed by the facilitator server 206 as opposed to the facilitator application executed on the client device 236. For example, upon execution, the facilitator application may obtain user-specific information and may transmit that user-specific information to the facilitator server 206. Upon the facilitator server 206 determining that the user is authenticated, the facilitator server 206 may communicate the user's authenticity to the SRT server at 328.

In some embodiments, the SRT server may maintain supplemental information related to a user. For example, the SRT server 202 may maintain one or more shipping addresses associated with the user. In at least some of these embodiments, the SRT server 202 may select a set of supplemental information to be provided to the initiator server 204 (i.e., a default shipping address). In some embodiments, the SRT server may request some set of supplemental information from the user. For example, the SRT server 202 may transmit a request to the facilitator server 206 for supplemental information at 330. The facilitator server 206 may, in some embodiments, present one or more options to a user at 332. For example, the SRT server 202 may request shipping information from the facilitator server 206 at 330. The facilitator server 206 may, in turn, identify a number of shipping addresses available to the user. Once identified, the facilitator server 206 may present the number of shipping addresses to the client device 236 for presentation to the user at 332 via the facilitator application. The user may then select a shipping address to be associated with the transaction. The user's selection may be communicated back to the facilitator server 206 at 334 and subsequently to the SRT server 202 at 336.

In some embodiments, once the SRT server 202 has determined that the user is authenticated, it may generate a token to be used in the requested transaction. This may involve generating a token (e.g., a randomly generated string of characters) which may be mapped to the selected account in a token vault. Once the SRT server 202 has identified the supplemental information to be included in the transaction (e.g., shipping information), the SRT server 202 may provide a token to the initiator server 204 at 338. The initiator server 204 may subsequently complete the transaction and present a confirmation notification. In some embodiments, to do this, the initiator server may provide the token to the resource provider 232 for the resource provider to complete the transaction using the token at 340. In some embodiments, the resource provider 232 may store the token for future use. In some embodiments, the initiator server 204 may generate an authorization request message on behalf of the resource provider, which it may route to the SRT server 202 (e.g., via a transaction processing network).

In some embodiments, the resource provider may complete the transaction by submitting an authorization request message including the token, the transaction amount, and a resource provider ID to the processing network (e.g., processing network 110(C)(1)) via an acquirer computer (not shown). The processing network may be determine a real account identifier (e.g., a PAN or primary account number) associated with the token, and may generate a modified authorization request message including the real account identifier to an authorizing entity computer operated by an authorizing entity such as an issuer. The authorizing endity may approve or deny the request, and may generate an authorization reponse message including the authorization decision. The authorization response message may be transmitted back to the processing network, and the processing network may substitute the token for the real account identifier in the authorization respose message. The modified authorization response message may then be transmitted back to the resource provider. At the end of the day or any other suitable periood of time, a clearing and settlement process may take place between the acquirer and the authorizing entity, via the processing network.

Figure 4:
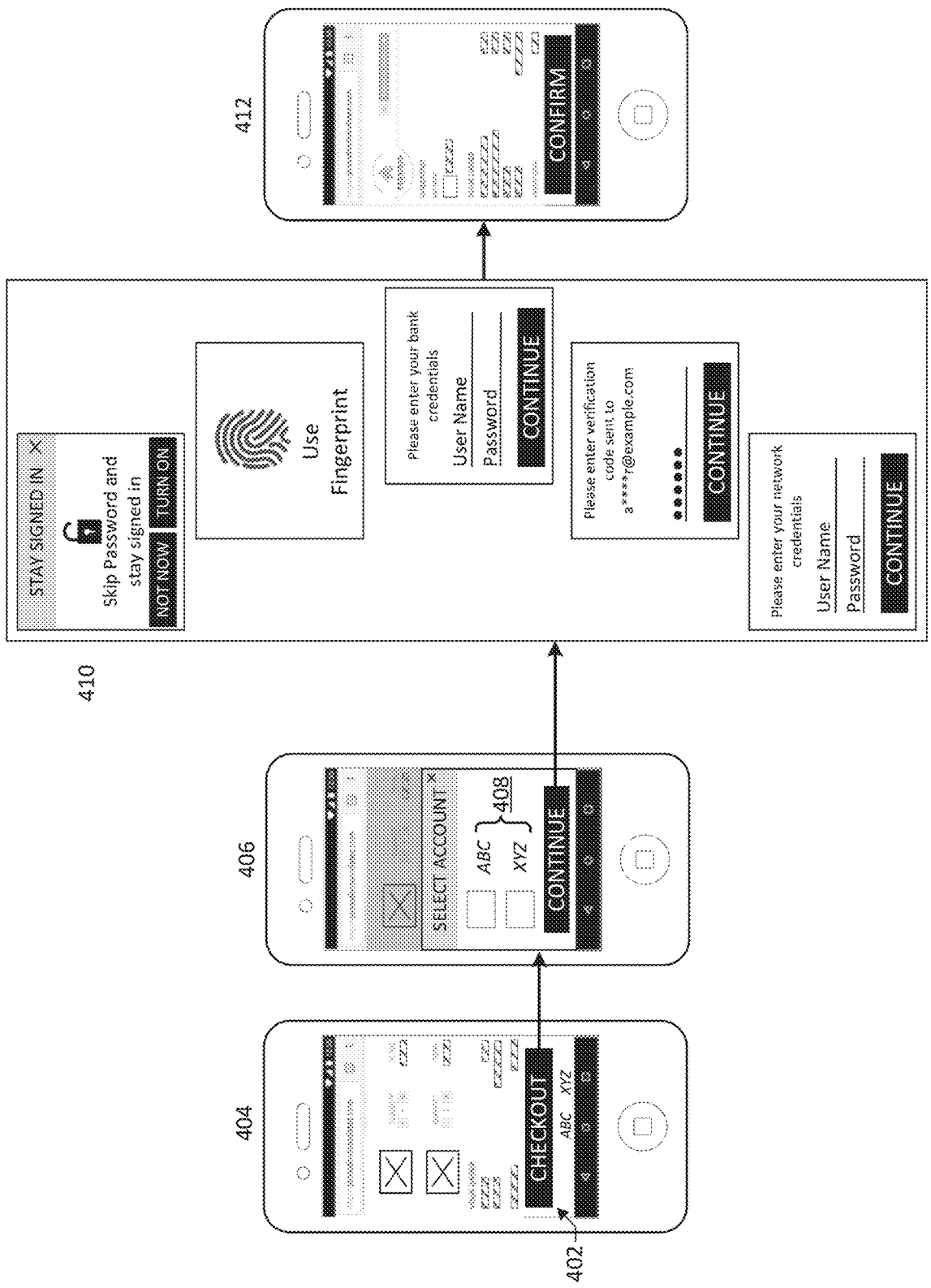
FIG. 4 depicts a process for authenticating a user in accordance with embodiments of the disclosure.

FIG. 4 depicts a process for authenticating a user in accordance with embodiments of the disclosure. In FIG. 4, a checkout element 402 may be selected within a checkout graphical user interface (GUI) 404 having a resource provider's checkout page. Upon selection of the checkout element 402, the user may be identified and presented an account selection GUI 406 containing a list of available accounts 508 for that user. As described herein, the user may be identified by an initiator server by querying a number of SRV servers supporting that initiator server.

In some embodiments, an account presentation space within the list of available accounts 408 may be at least partially customizable by an authorization entity. For example, the authorization entity may be provided with a format for an account presentation space associated with an account in the list of accounts and the authorization entity may be free to fill that space as it wishes. In some embodiments, data provided in the account presentation space may be dynamic (e.g., determined at the time of the transaction) or static. In some embodiments, the information provided in the account presentation space may vary based on the user or transaction. For example, the authorization entity may provide a different graphic for an account based on a status that the user has with that authorization entity (e.g., silver member, gold member, or platinum member).

Based on the user's selection of an account from the list of accounts 408, the user may be presented with a number of authentication options 410 capable of providing authentication for the selected account. The authentication options 410 may be provided based on capabilities of the initiator and/or the facilitator application installed upon the client device. Some examples of authentication options include enabling a user to stay logged into an account. In some embodiments, this may involve storing a cookie on the client device that enables the initiator to quickly identify the user and retrieve a token previously generated for that user. In some embodiments, this may require that the user first be authenticated using a different authentication technique, but may enable quick authentication in future transactions. A second example of an authentication option may be the use of biometric information (e.g., a fingerprint scan) by the user. A third authentication option may include the user logging into an account maintained by an authorization entity associated with the account using proper login credentials. Another authentication option may include the use of a one-time passcode provided to a channel that the user has access to (e.g., email or text message). Yet another authentication option may include the user logging into an account maintained by a transaction processing network associated with the account using proper login credentials. Although some specific examples have been provided, these illustrated examples are not intended to be limiting. It should be noted that one skilled in the art would recognize that a number of alternative authentication options may be available to a user for authenticating an account.

The user may then select an authentication option 410 and may be authenticated in accordance with that selected authentication option. Once authenticated, the resource provider may be provided with a token to complete the transaction and the user may be given an opportunity to confirm the transaction via a confirmation GUI 412 as well as select a shipping address or other information to be included in the transaction.

Figure 5:
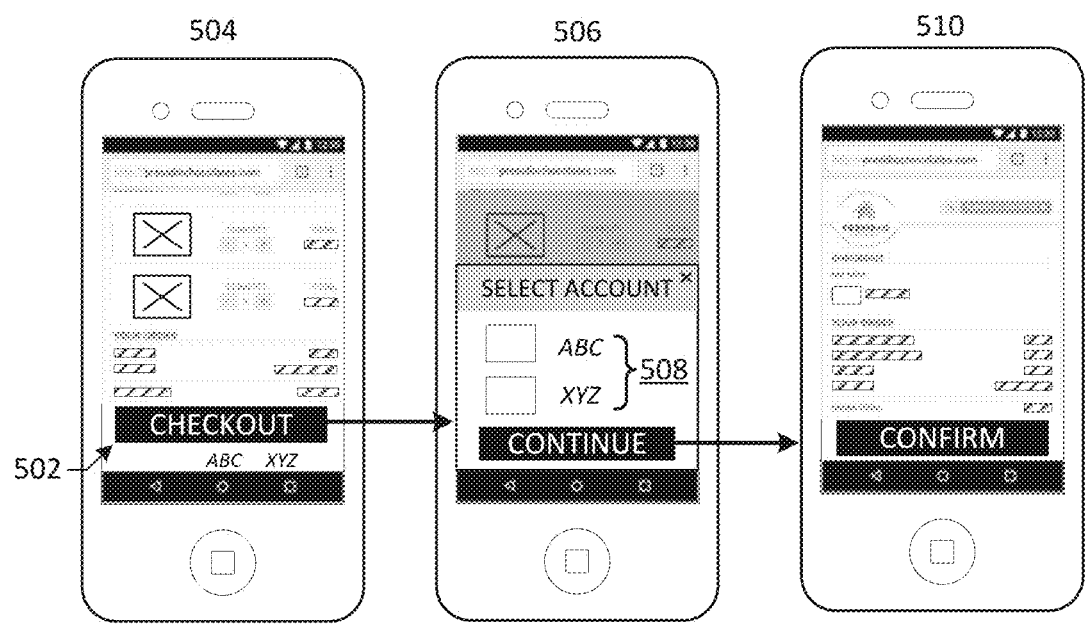
FIG. 5 depicts an example process in which an indication of an account on file is provided to the initiator server by a resource provider in accordance with at least some embodiments.

FIG. 5 depicts an example process in which an indication of an account on file is provided to the initiator server by a resource provider in accordance with at least some embodiments. In this example, a user may be a return customer for a resource provider at which a transaction is to be conducted. In some embodiments, the user may have an account maintained by the resource provider.

In the illustrated example, the user may have previously conducted at least one transaction using the processes described herein. As a result of that process, the resource provider may have received a token generated by the SRT server in the at least one previous transaction upon authentication of the user. In the illustrated example, the resource provider may have stored the received token in relation to the account maintained by the resource provider. Upon the user logging into an account maintained by the resource provider, the resource provider may retrieve the previously-received token.

Upon initiation of a transaction completion process (e.g., by selection of a checkout element 502) in 504, the resource provider (or initiator) may identify a token which was previously used by that user (i.e., a card on file). The resource provider may transmit the identity and/or the token to the initiator upon selection of the checkout element 502. As depicted at 506, the initiator may then present the previously-used account information 508 to the user for selection. In some embodiments, if the user selects the same account information for which the previously generated token was received, then either the initiator or the resource provider may initiate completion of the new transaction using that token, bypassing one or more of the processes described herein. In some embodiments, as depicted in this example, the initiator may not contact the SRT server as described elsewhere. Instead, the transaction may be completed using the previously received token and the user may be presented with a confirmation screen 510.

Figure 6:
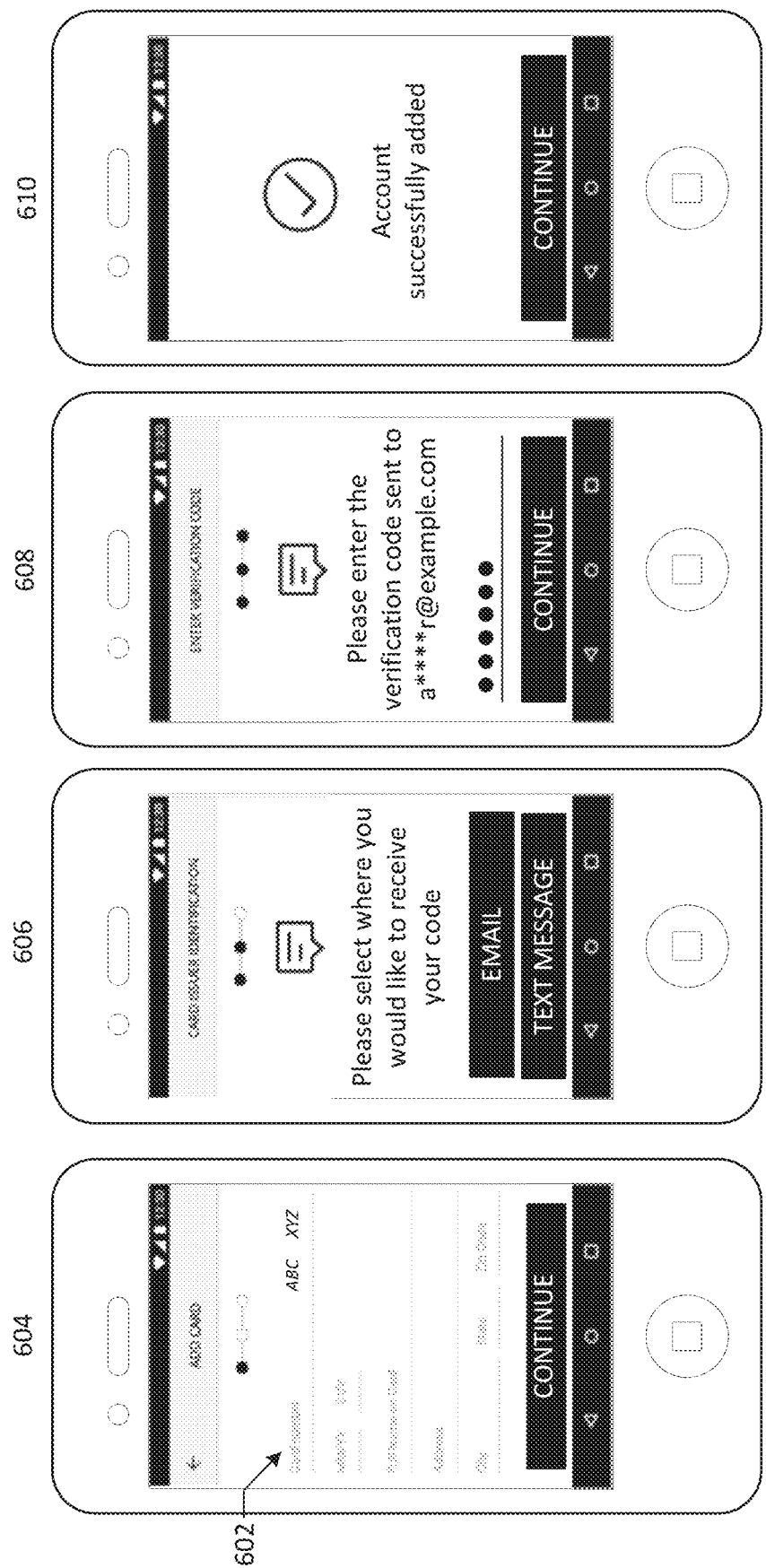
FIG. 6 depicts an example provisioning process by which a user is able to manually add his or her accounts to be processed by the initiator server in accordance with some embodiments.

FIG. 6 depicts an example provisioning process by which a user is able to manually add his or her accounts to be processed by the initiator server in accordance with some embodiments. In at least some embodiments, the process depicted in FIG. 6 may be performed if the initiator is unable to automatically identify one or more accounts associated with a user (e.g., the client device used by the user is new or does not have a cookie in memory). This process enables the user to manually identify one or more accounts.

In this example provisioning process, the user may provide an indication of one or more accounts with which he or she is associated. In some embodiments, the initiator server may contact an authorization entity (e.g., an issuer) associated with the indicated account. In some embodiments, the initiator may contact an SRT server associated with a processing network that the account is associated with. The SRT server may, in turn, communicate with an authorization entity to verify the account. An authorization entity associated with the account may then verify that the user is associated with the account. An authentication process may then be performed as described herein.

In some embodiments, this process may involve requiring a user to provide at least one account number via an input field 602 at 604. The initiator may then determine, based on the account number provided, a transaction processing network and/or an authorization entity associated with the account. It should be noted that at least some account identifiers may include a banking identification number (BIN) that can be used to identify both the transaction processing network and the authorization entity as a portion of the account number. The initiator may then communicate with the identified authorization entity or an SRT platform associated with the identified transaction processing network.

In some embodiments, the identified authorization entity or the SRT platform associated with the identified transaction processing network may identify one or more communication channels associated with the user of the account. The one or more communication channels, or at least an obfuscated version of those communication channels, may be presented to the user at 606 to enable the user to verify his or her ownership of the account via those communication channels. In some embodiments, multiple communication channels may be presented to the user for his or her selection. In some embodiments, a default communication channel may be selected over which to communicate with the user.

Once an appropriate communication channel has been identified, the authorization entity or the SRT platform may transmit verification details to the user via the identified communication channel. In some embodiments, the verification details may include a code or pin. The user may then be required to provide those verification details back at 608 in order to verify that the user at least has access to the communication channel.

In some embodiments, once a user has been verified as being an owner of the account using the techniques depicted in FIG. 6, a cookie may be placed onto the client device from which the process was initiated. The cookie may include identifier information that may be used by the initiator to automatically identify the account in the future.

By way of illustrated example, as depicted in FIG. 6, a user may be prompted to enter an account to be linked to himself or herself at 604. In this example, the authorization entity, once contacted, may initiate a verification process. For example, the authorization entity may provide verification details (e.g., a one-time code) to a communication channel known to be associated with the user. To do this, the authorization entity may provide the user with a choice of communication channel to which the verification details will be transmitted at 606. The user may then be asked to retrieve the verification details in order to verify that the user is authentic at 608. If the verification details provided by the user match those sent via the selected communication channel, then the account may be verified as being associated with the user at 610. It should be noted that the verification process described herein may be separate from the authentication process described elsewhere. In some embodiments, even though the user has verified his or her ownership of an account in the manner depicted in FIG. 6, the user may still be authenticated using the other techniques described herein.

Figure 7:
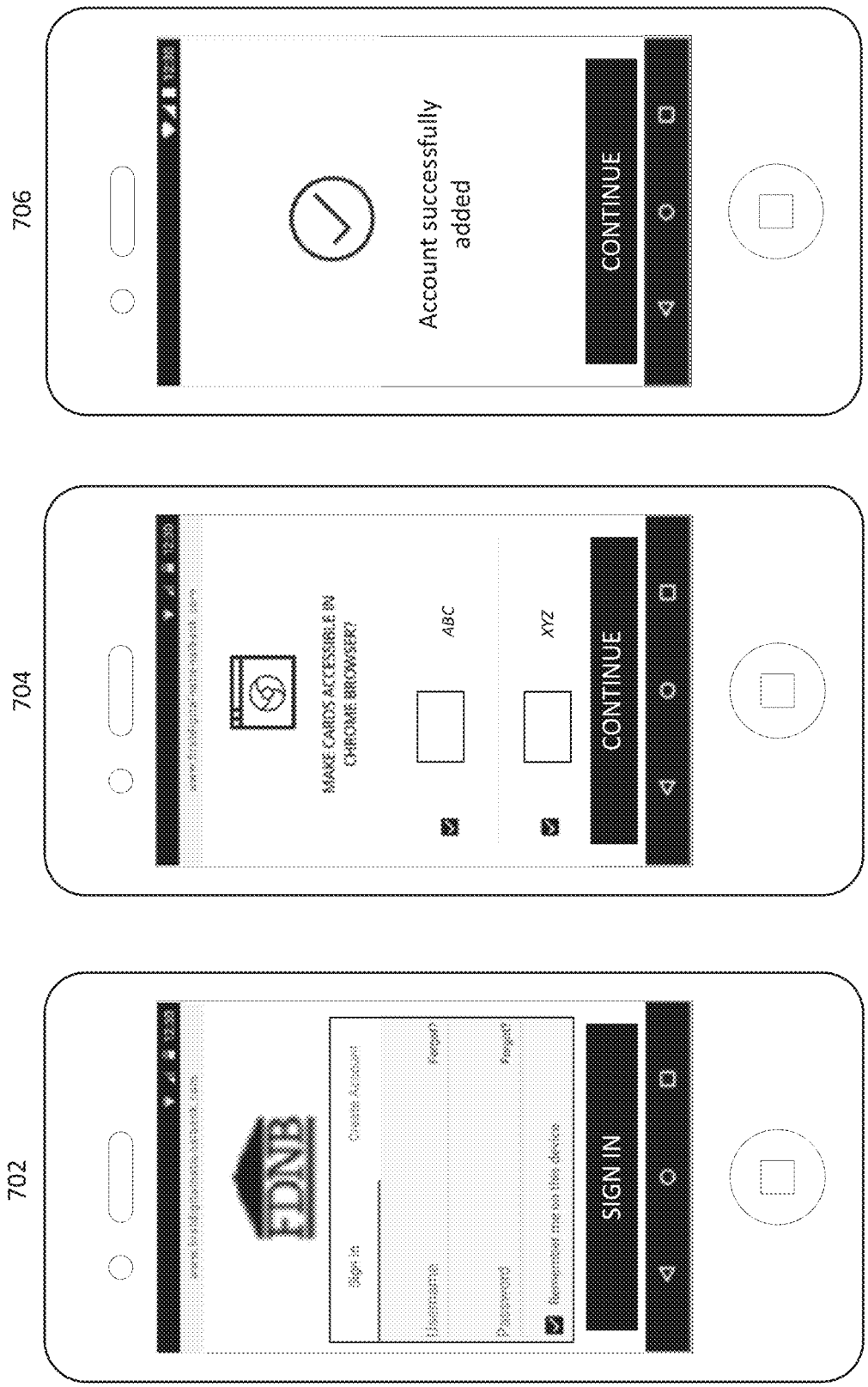
FIG. 7 depicts an example provisioning process in which an SRT platform or an authorization entity pushes an indication of one or more accounts to the initiator server.

FIG. 7 depicts an example provisioning process in which an SRT platform or an authorization entity pushes an indication of one or more accounts to the initiator server. In some embodiments, a user may log into an account maintained by an SRT platform or authorization entity (e.g., an issuer). Once logged in, various accounts may be identified as being associated with the user account. In some embodiments, an identifier for the user may be provided to the receiving entity via a helper function. It should be noted that in embodiments in which the user logs into an account maintained by an authorization entity, the authorization entity may identify multiple accounts maintained by that authorization entity, each of which may be associated with the same or a different transaction processing network. In contrast, if the user logs into an account maintained by an SRT platform (or a transaction processing network), then the SRT platform may identify multiple accounts, each of which uses the same transaction processing network (the transaction processing network associated with the SRT platform) but may be associated with different authorization entities.

In some embodiments, if the initiator is unable to automatically identify accounts associated with a user, the initiator may provide the ability for the user to manually log into an account associated with either an SRT platform or an authorization entity in order to automatically identify accounts associated with that entity. In this process, the user may select an icon that indicates an appropriate entity into which the user would like to log in. Upon selection of that icon, the user (via his or her client device) may be redirected to a site hosted by the selected entity at 702. Upon reaching this site, the user may be required to provide login credentials (or otherwise authenticate himself/herself) to the selected entity in order to obtain access to an account maintained by the selected entity. Upon obtaining access to the selected entity, the user may be presented with a complete list of the accounts associated with that entity. The user may be given the ability to select some portion of, or all of, the accounts in the list of accounts for transmittal to the initiator at 704. Once the user has selected one or more accounts, the selected entity may be caused to transmit identifiers for each of the selected accounts to the initiator server. A notification may be provided to the user by the initiator server at 706.

In some embodiments, the initiator server may maintain a separate account associated with the user. The user may be asked if he or she wishes to enroll any/all of the accounts associated with the authorization entity and/or SRT platform with the initiator server. If the user indicates that he or she does, then the appropriate entity may provide the account information to the initiator server to be linked to that user's account with the initiator server. In some embodiments, the appropriate entity may transmit a file to the initiator server that includes a mapping between accounts and email data. The accounts indicated in that file may then be mapped to a user account associated with an email address.

In some embodiments, the user may log into an account associated with the initiator server. Upon receiving a request from the user, the initiator server may provide the user's identity, along with a request for account information, to a SRT platform that includes a transaction processing network. In this example, the SRT platform may duplicate the request and route it to a number of different authorization entities. The authorization entities may then each query an account database to determine whether the user is associated with an account that it maintains. The SRT platform may then aggregate each of the accounts identified in this way and may provide those accounts to the initiator server. In some embodiments, the request may be submitted to a number of different SRT platforms.

Figure 8:
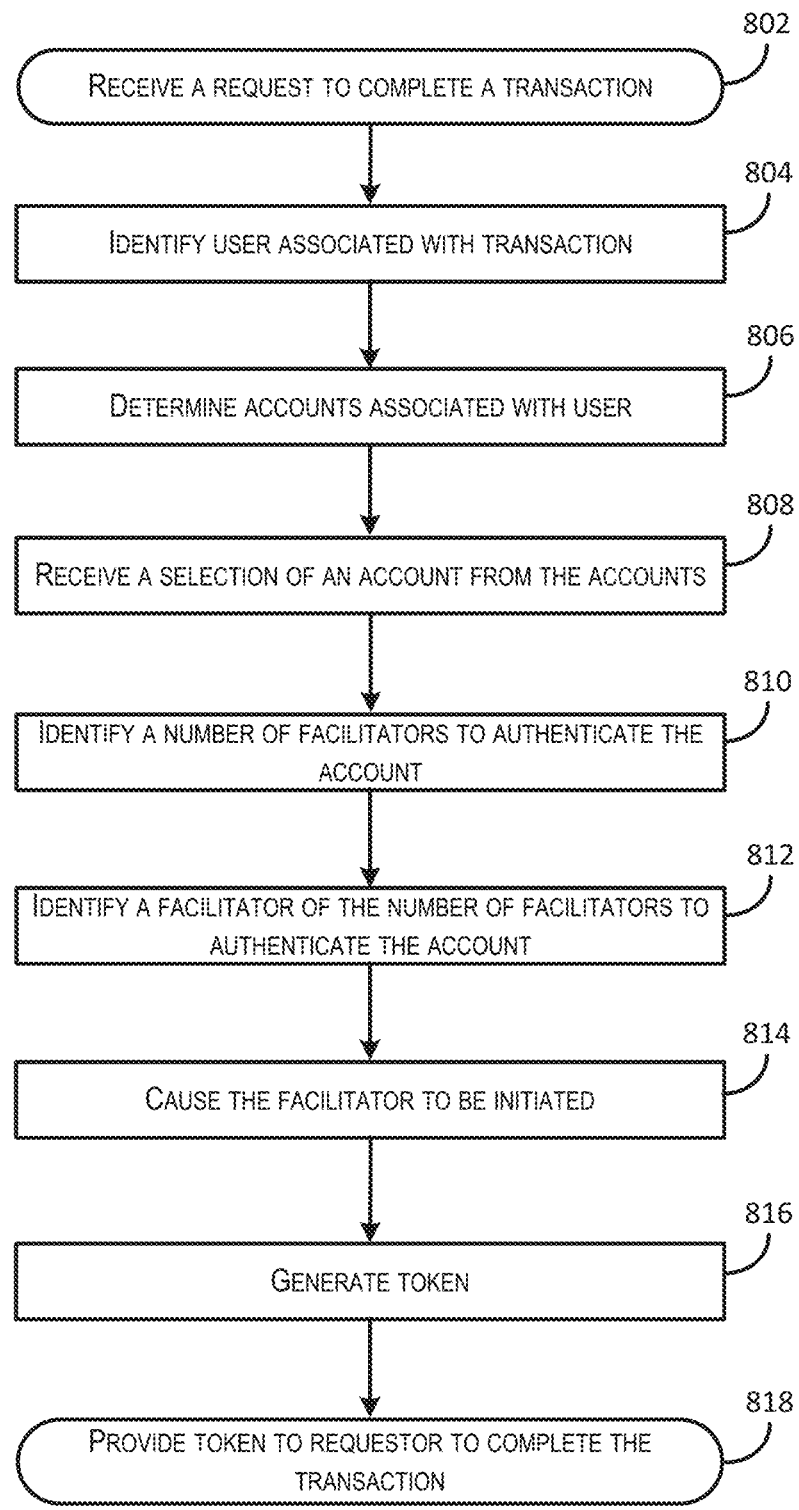
FIG. 8 depicts a flow diagram illustrating a process for completing a transaction in accordance with at least some embodiments.

FIG. 8 depicts a flow diagram illustrating a process for completing a transaction in accordance with at least some embodiments. Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with some embodiments, the process 800 of FIG. 8 may be performed by at least the SRT server 202 shown in FIG. 2. The code may be stored on a computer-readable storage medium, for example, in the form of a computer program including a plurality of instructions executable by one or more processors. The computer-readable storage medium may be non-transitory.

Process 800 may begin at 802, when a request to complete a transaction is received. In some embodiments, the request may be received from an initiator upon selection of a checkout element on a webpage of a resource provider. The request may include information about the user and/or the transaction. In some embodiments, the request may include an identifier that may be used to identify the user. For example, the request may include an email address that may be linked to an account maintained with respect to a user. The user may be identified based on that identifier at 804.

At 806, the process may involve identifying a number of accounts associated with the user. In some embodiments, this may involve querying a number of authorization entities for account information associated with the user. The process may then involve receiving a number of responses from different authorization entities that each include a list of accounts associated with the user. A complete list of accounts associated with the user may be compiled from the received responses from each of the authorization entities. Once compiled, the complete list of accounts may be provided to the initiator for presentation to the user. At 808, a selection of a particular account of the complete list of accounts may be received.

At 810, the process may involve determining a number of facilitators capable of providing authentication for the account. In some embodiments, the authorization entity associated with the account may provide a set of facilitators capable of providing authentication for the account to a SRT platform. In some embodiments, the set of facilitators may be selected based on functionality of a client device associated with the user. A facilitator may be selected from the set of facilitators to be used to authenticate the user at 812. In some embodiments, the facilitator may be selected based on a level of trust associated with the facilitator. In some embodiments the facilitator may be selected from the set of facilitators based on the user's historical use of the selected facilitator. For example, the facilitator may be selected on the grounds that it is the facilitator most commonly used by the user.

At 814, once a facilitator has been selected from the set of facilitators, the process may involve causing the facilitator to initiate an authentication process. In some embodiments, this may involve communicating with a facilitator server. The facilitator server may, in turn, provide instructions to a facilitator application installed upon a client device. The instructions may cause the facilitator application to be executed. Upon execution, the facilitator application may obtain information about the user of the client device. The facilitator application may then authenticate the user based on the obtained information. Upon determining whether the user is authenticated, the facilitator may respond to the request for authentication with an indication as to whether or not the user is authenticated.

At 816, the process may involve, upon determining that the user is authenticated, generating a token to be used in the transaction. In some embodiments, the token may be a one-time use token. In some embodiments, the token may only be used by the resource provider associated with the transaction for transactions completed with respect to a single user. The token may be provided to the resource provider at 818. In some embodiments, the resource provider may store the token for use in future transactions.

Embodiments of the disclosure may provide a number of advantages over conventional systems. For example, the system described herein enables a resource provider to complete transactions using a number of different types of transaction processing options regardless of the architecture used by the resource provider. Furthermore, new transaction processing options may be incorporated without any further action by the resource provider. In addition, resource providers can take advantage of user authentication techniques installed on a user's own client device, decreasing the risk of fraud associated with conducting the transaction.

Embodiments of the invention provide more flexibility than conventional authentication systems. For example, by using an initiator server, a user's mobile device can be affiliated with and updated with different facilitators with different authentication capabilities over time, without making substantial changes to the authentication infrastructure. Facilitators can be updated or created, independently of resource providers, the initiator can be updated to allow the user's mobile device to effectively interact with those new and/or updated facilitators. This advantages can also be applied to the use of different SRT (secure remote transaction) systems that may be associated with the user's mobile device, and that may be updated and/or added. Stated different, by using the initiator as in embodiments of the invention, authentication systems involving disparate entities can be updated and changed, with much difficulty as compared to conventional systems.

Figure 9:
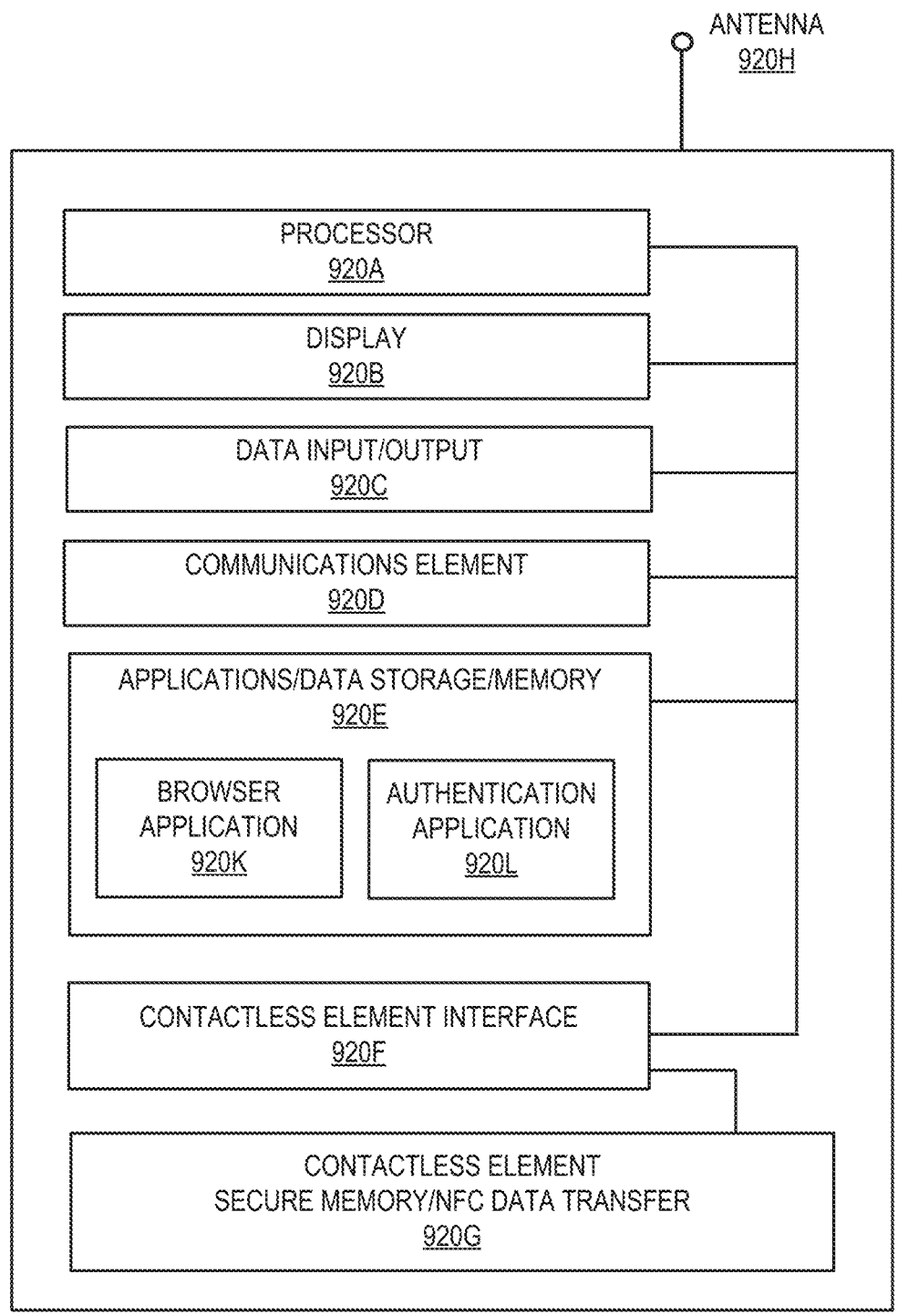
FIG. 9 shows an example of the client device 920, according to some embodiments of the invention.

FIG. 9 shows an example of the client device 920, according to some embodiments of the invention. Client device 920 may include circuitry that is used to enable certain device functions, such as telephony. The functional elements responsible for enabling those functions may include a processor 920A that can execute instructions that implement the functions and operations of the device. Processor 920A may access memory 920E (or another suitable data storage region or element) to retrieve instructions or data used in executing the instructions, such as provisioning scripts and mobile applications. Data input/output elements 920C, such as a keyboard or touchscreen, may be used to enable a user to operate the client device 920 and input data (e.g., user authentication data). Data input/output elements 920C may also include biometric sensors. Data input/output elements may also be configured to output data (via a speaker, for example). Display 920B may also be used to output data to a user. Communications element 920D may be used to enable data transfer between client device 920 and a wired or wireless network (via antenna 920H, for example) to assist in connectivity to the Internet or other network, and enabling data transfer functions. Client device 920 may also include contactless element interface 920F to enable data transfer between contactless element 920G and other elements of the device, where contactless element 920G may include a secure memory and a near field communications data transfer element (or another form of short range communications technology). As noted, a cellular phone or similar device is an example of a client device 920 that may be used in accordance with embodiments of the present invention. However, other forms or types of devices may be used without departing from the underlying concepts of the invention. For example, the mobile computing device 920 may be in the form of a portable device, a key fob, a tablet computer, vehicle, a wearable device, etc.

The memory 920E may comprise at least a browser application 920K and a facilitator application 920L, and any other suitable module or data. The client device 920 may have any number of mobile applications installed or stored on the memory 920E and is not limited to that shown in FIG. 9.

Embodiments of the disclosure provide for a number of technical advantages over conventional systems. For example, unlike conventional transaction processing systems, the user is able to select a method of authentication to be used for each transaction irrespective of the merchant's authentication requirements. In other words, the user is not limited to only those authentication processes used by the merchant. The system expands the list of authentication techniques available for use in a transaction while maintaining a high level of security. Embodiments of the system also enable a user to quickly access each of his or her accounts without the need to enter sensitive information (e.g., a PAN), which may be insecurely transmitted and subsequently intercepted by an unauthorized third party. Additionally, each transaction is provided a one-time use token, which increases the security of the transaction as the one-time use token may only be used for the specific transaction at issue.

A computer system may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a secure remote transaction (SRT) server from a client device via an initiator, a request to complete a transaction;
determining an identity of a user associated with the request to complete the transaction;
determining a number of accounts associated with the user, each of the accounts maintained by an authorization entity separate from the SRT server, the number of accounts determined by separately transmitting queries to a number of authorization entity servers on the determined identity of the user;
receiving a selection of an account from the number of accounts;
identifying one or more facilitator software applications capable of supporting the selected account from a set of facilitator software applications installed on the client device, each of the facilitator software applications in the set of facilitator software applications comprising a software application capable of authenticating the user of the client device;
selecting a facilitator software application from the one or more facilitator software applications to authenticate the user;
causing the selected facilitator software application to be initiated to perform an authentication process with respect to the user, wherein the authentication process comprises collection of biometric information associated with the user by the selected facilitator software application using one or more sensors on the client device, the biometric information including one or more of fingerprint, retinal, or voice data;
receiving an authentication indicator resulting from the authentication process performed by the selected facilitator software application, the authentication indicator indicating that the authentication process was successful; and
upon receiving the authentication indicator from the selected facilitator software application, obtaining a transaction-specific token to be associated with the transaction, wherein the token is a substitute for an identifier of the account, wherein obtaining the token comprises generating the token to be associated with the transaction, and wherein the token is used by a resource provider to complete the transaction associated with a resource provider checkout page of the resource provider, such that the resource provider is not provided information for the number of accounts associated with the user.

2. The method of claim 1, wherein the SRT server is one of a plurality of SRT servers.

3. The method of claim 1, wherein the request is received upon selection of a checkout element on a checkout page of the resource provider.

4. The method of claim 1, wherein selecting the facilitator software application from the one or more facilitator software applications comprises:
providing a list of the one or more facilitator software applications to the user; and
receiving a selection of the facilitator software application from the list of the one or more facilitator software applications.

5. The method of claim 1, wherein selecting the facilitator software application from the one or more facilitator software applications comprises selecting the facilitator software application associated with a highest level of trust.

6. The method of claim 1, wherein the one or more facilitator software applications are identified based on capabilities associated with the facilitator software applications.

7. The method of claim 1, wherein the one or more facilitator software applications are identified based on receiving an indication from the authorization entity, the indication being of facilitators usable with the selected account.

8. A computing system comprising:
a processor; and
a memory including instructions that, when executed with the processor, cause the computing system to, at least:
receive, from a client device via an initiator, a request to complete a transaction;
determine an identity of a user associated with the request to complete the transaction;
determine a number of accounts associated with the user, each of the accounts maintained by an authorization entity separate from the computing system, the number of accounts determined by separately transmitting queries to a number of authorization entity servers on the determined identity of the user;
receive a selection of an account from the number of accounts;
identify one or more facilitator software applications capable of supporting the selected account from a set of facilitator software applications installed on the client device, each of the facilitator software applications in the set of facilitator software applications comprising a software application capable of authenticating the user of the client device;
select a facilitator software application from the one or more facilitator software applications to authenticate the user;
cause the selected facilitator software application to be initiated to perform an authentication process with respect to the user, wherein the authentication process comprises collection of biometric information associated with the user by the selected facilitator software application using one or more sensors on the client device, the biometric information including one or more of fingerprint, retinal, or voice data;
receive an authentication indicator resulting from the authentication process performed by the selected facilitator software application, the authentication indicator indicating that the authentication process was successful; and
upon receiving the authentication indicator from the selected facilitator software application, obtain a transaction-specific token to be associated with the transaction, wherein the token is a substitute for an identifier of the account, wherein obtaining the token comprises generating the token to be used in the transaction, and wherein the token is mapped to the account in a database maintained by the computing system.

9. The computing system of claim 8, wherein the selected facilitator software application is caused to be initiated to perform the authentication process via a push notification.

10. The computing system of claim 8, wherein performing the authentication process comprises obtaining user specific data comprising the biometric information and comparing the user specific data to expected user specific data.

11. The computing system of claim 8, wherein the identity of the user associated with the request is an email address associated with the user.

12. The computing system of claim 11, wherein the email address is obtained from application data retrieved from the memory of the client device, the application data being a cookie.

13. The computing system of claim 12, wherein the cookie is obtained via a helper function on a browser of the client device.

* * * * *